United States Patent
Roche

(10) Patent No.: US 7,996,273 B2
(45) Date of Patent: Aug. 9, 2011

(54) METHOD AND PRINT MERCHANT COMPUTER FOR MATCHING PRINT ORDERS TO PRINT SERVICE PROVIDERS

(75) Inventor: Alex Roche, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 637 days.

(21) Appl. No.: 12/023,593

(22) Filed: Jan. 31, 2008

(65) Prior Publication Data

US 2008/0189191 A1    Aug. 7, 2008

Related U.S. Application Data

(62) Division of application No. 10/088,715, filed on Mar. 19, 2002, now abandoned.

(51) Int. Cl.
   *G06Q 30/00*   (2006.01)
   *G06F 17/30*   (2006.01)
(52) U.S. Cl. .................. 705/26.1; 705/26.4; 705/26.41; 705/26.61
(58) Field of Classification Search .............. 705/26–27, 705/26.1–27.2
See application file for complete search history.

(56) References Cited

U.S. PATENT DOCUMENTS

| | | | | |
|---|---|---|---|---|
| 6,016,504 A | * | 1/2000 | Arnold et al. | 709/200 |
| 6,397,197 B1 | * | 5/2002 | Gindlesperger | 705/37 |
| 6,886,028 B1 | * | 4/2005 | Matsuyama et al. | 709/203 |
| 7,058,598 B1 | * | 6/2006 | Chen et al. | 705/26 |
| 7,451,106 B1 | * | 11/2008 | Gindlesperger | 705/37 |
| 7,796,283 B2 | * | 9/2010 | Field | 358/1.15 |
| 2003/0140315 A1 | * | 7/2003 | Blumberg et al. | 715/527 |
| 2005/0206864 A1 | * | 9/2005 | Garfinkle et al. | 355/40 |
| 2009/0125415 A1 | * | 5/2009 | Gindlesperger | 705/26 |
| 2011/0040597 A1 | * | 2/2011 | Field | 705/8 |

OTHER PUBLICATIONS

California hospitals have new agreement for printing services with XYAN.com Anonymous. Hospital Materials Management. Ann Arbor: May 2000. vol. 25, Iss. 5; p. 5, 1 pgs.*
Ultramar inks promotions contract with Store Direct James Aldridge. San Antonio Business Journal. San Antonio: Jun. 2, 2000. vol. 14, Iss. 18; p. 8.*
Printing site tries for perfect match; [2 Edition] Armstrong, David. The Press. Christchurch, New Zealand: May 16, 2000. p. 13.*

* cited by examiner

*Primary Examiner* — Will Allen

(57) ABSTRACT

A method is provided for operating an on-line retailing operation for retailing of at least one print product to a customer. The print product is supplied by a print merchant operation that displays plural image items for remote viewing by a customer. The print merchant operation transacts a first type of order with the customer for supply of at least one print product, and transacts a second type order with the print merchant for fulfillment of the first type order.

10 Claims, 19 Drawing Sheets

```
                                                            1400

<?xml version="1.0" encoding="UTF-8" ?>
<!DOCTYPE Order SYSTEM
"http://control.hpposter.com/xml/schema/V3.4/order.dtd">
    <order version ="3.4">
    <order>
        <!- order control - ->                             1401
        <job>
            <!-- what to print -->                         1402
            <!-- how to print -->                          1403
        </job>
        <shipping>
            <!-- how & where to ship -->                   1404
        <shipping>
    </order>
```

Fig. 14

| | | |
|---|---|---|
| version: | Text value | 1500 |
| orderID: | Text value | 1501 |
| portalID: | Text value | 1502 |
| portalKey: | Text value | 1503 |
| customID: | Text value | 1504 |
| customNote: | Text value | 1505 |
| currency: | ISO.4127 Num | 1506 |

Fig. 15 jobPrice: [Number value] 1600 jobType: [Multiple options...▼] 1601 jobURL: [Text value] 1602
[FOR ORDER SUBMISSION]

previewURL: 1603
[FOR ORDER SUBMISSION][OPTIONAL]

contentID: [Text value] 1604 contentDescription: [Text value] 1605

Fig. 16 paperSize: [Multiple options...▼] 1700 customWidth: [Number value] 1701
[FOR CUSTOM PAPER]

customHeight: [Number value] 1702
[FOR CUSTOM PAPER]

customUnits: [Multiple options...▼] 1703
[FOR CUSTOM PAPER]

mediaType: [Multiple options...▼] 1704 copiesNumber: [Number value] 1705
[FOR MORE THAN 1]

Fig. 17

| | |
|---|---|
| shipMethod: [Multiple options..▽] | 1800 |
| shipName: [Text value] | 1801 |
| shipAddress: [Text value] | 1802 |
| shipZipCode: [Text value] | 1803 |
| shipCity: [Text value] | 1804 |
| shipStateOrProvince: [Text value] | 1805 |
| shipCountryCode: [Text value] | 1806 |
| shipNotificationURL: [Text value] [OPTIONAL] | 1807 |
| contactEmail: [Text value] | 1808 |
| contactPhone: [Text value] | 1809 |

Fig. 18

METHOD AND PRINT MERCHANT COMPUTER FOR MATCHING PRINT ORDERS TO PRINT SERVICE PROVIDERS

FIELD OF THE INVENTION

The present invention relates to the field of printing, and particularly, although not exclusively, to a method and apparatus for enabling an improved e-printing service solution.

BACKGROUND TO THE INVENTION

Conventional print service facilities comprise one or a plurality of printers in a single physical location, e.g. a print shop or print room, which provide to a customer a printing service for posters, brochures, leaflets, copies of photographs and the like. Typically, a print service facility may comprise one or more large format printers capable of printing to large format size media, for example a HP DesignJet printer, and may comprise one or a plurality of smaller format printers, for example HP laser jet printers for printing smaller format sizes, e.g. A4 or similar.

Such printers may print images supplied by a customer on data carrier, for example CD ROM, floppy disk or the like. It is known for a print service provider to provide direct to a customer an internet enabled driver for installation on a customer's own computer which is capable of sending customer generated images from the customer's computer to a computer at the print facility. Such systems are limited to single print companies providing proprietary internet enabled drivers to their customers, for using the facilities of the print service provider only.

Mediaflex.com (http://www.mediaflex.com) offer an internet accessible printing service using a standard web browser interface. This service is of the type provided by a single print service provider directly to their customers.

Internet content retailer Barnes and Noble, offers posters for sale, which are supplied by print service provider Buynlarge, who provide a centralized printing facility in a single location. However, this service only supports limited print sizes.

Other companies having an Internet presence include Impress, and Colleria, both of which act as on-line intermediaries for brokerage of print jobs, to match on-line print service buyers with print service providers. However, this service is not fully automated and it is left for the buyers to contact the print service providers direct for transfer of image content, and for invoicing purposes.

Similarly, the on-line company Iprint, provides an on-line service over the internet for customizing business cards, promotional material and the like. However, this service does not provide a fully automated printing service for on-line customers.

The known Mimeo service provides centralized printing, but is restricted to serving US customers only, and provides small format prints, supporting only a single paper size.

Prior art on-line print service solutions are restricted to a small number of individual print service providers offering on-line image transfer facilities to their customers, and without choice of print service provider.

SUMMARY OF THE INVENTION

One object of the present invention is to utilize internet infrastructure to create an on-line marketplace for print services, in a manner which balances the interests of a plurality of users of print services, with the interests of a plurality of print service providers in an efficient manner.

Another object of the present invention is to provide an infrastructure for print on demand services provided over the internet, with full automation of print ordering, including competitive tendering for print services, and automated printing prior to delivery of prints to a customer.

An automated print on demand service as disclosed herein, is accessible over a communication network, for example the internet and matches a plurality of customers for print services to a plurality of print service providers, satisfying orders for print services placed by the customers on-line over the network. Customers may include content retailer website operators, providing a content selection made available to the general public over the internet. For example, content retail websites may make available a series of images suitable for producing large format posters which can be ordered by the general public, or to subscribers of the website using an e-commerce engine comprising the content retailer website. Other customers may include direct customers such as design agencies, marketing companies or the like who may generate repeat business for orders of print products.

A programmatic interface is provided to content retailer websites to enable those websites to fulfil requests for on-line printing via a print merchant. The print merchant is responsible for sending the content to a selected print service provider who prints the demanded print items. Prints are shipped to the user by a courier service. The end user may be the customer themselves or who may be a person specified by the customer. The programmatic interface provided to the content retailer websites comprises a set of libraries which facilitates the connection of the website to the print merchant.

According to a first aspect of the present invention, there is provided a method of operating an on-line retailing operation for retailing of at least one print product to a customer, said print product supplied by a print merchant operation, said method comprising the steps of:

displaying a plurality of image items for remote viewing by said customer;

transacting an order of a first type with said customer for supply of said at least one print product;

transacting an order of a second type with said print merchant for fulfillment of said first type order.

According to the second aspect of the present invention, there is provided an on-line image content retailer operation, said on-line image content retailer operation comprising at least one computer entity capable of:

displaying a plurality of image items for remote viewing by a plurality of customer terminals;

transacting orders of a first type for supply of print products with at least one said customer terminal;

transacting orders of a second type for sourcing fulfillment of a said first type order, with at least one print merchant.

The invention includes at least one computer entity capable of:

displaying a plurality of image items for remote viewing by a plurality of customer terminals;

transacting orders of a first type for supply of print products with at least one said customer terminal;

transacting orders of a second type for sourcing fulfillment of a said first type order, with at least one print merchant.

According to a third aspect of the present invention there is provided a method of operating a print merchant operation for matching a plurality of orders of a first type for print products, with a plurality of print service provider operations capable of fulfilling said order, said method comprising the steps of:

receiving a request for an order identification;

issuing an order identification in response to said request;
receiving a said order of a second type for supply of print products;
acknowledging said order;
selecting a print service provider operation from said plurality of print service provider operations;
placing an order of a third type with at least one said selected print service provider, for ordering supply of said print products.

The invention includes at least one computer entity configured for:
receiving electronically, a plurality of orders of a second type, for supply of at least one print product;
selecting a print service provider operation from a plurality of print service provider operations; and
placing at least one order of a third type with at least one selected said print service provider for ordering supply of said at least one print product.

In the specific implementations according to the present invention, the whole process of transacting an order for print products, and arranging the printing of those products is handled automatically on-line. All the necessary content information, orders, and specifications of print products are transmitted on-line automatically between computer entities, and a print service provider is automatically selected.

Other aspects of the invention are as recited in the claims attached hereto.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 14 illustrates schematically a structure of an order ticket XML file used by a print merchant computer entity for communicating with other computer entities;

FIG. 15 illustrates schematically an order control section of the order ticket file of FIG. 14;

FIG. 16 illustrates schematically a section describing what to print, of the order ticket document of FIG. 14;

FIG. 17 illustrates schematically a section of the order ticket document of FIG. 14 defining how to print an order;

FIG. 18 illustrates schematically a section of the order ticket document, describing how to ship and where to ship an order.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Whilst the following description applies to a plurality of computer entities communicating over the Internet, it will be understood by the person skilled in the art, that in general such entities may communicate over any communications network, including virtual private networks (VPN's), local area networks (LAN's), mobile telecommunications networks or the like.

In this specification, the term 'on-line' used in the context of computer entities or businesses, means a computer entity or business as appropriate, which can send and/or receive products and/or services in the form of electronic data over a communications network. The computer entity and/or business may also be capable of carrying out transactions over the communications link, in the form of exchanges of electronic data with other computer entities or businesses, over the communications network.

In this specification, the term 'communications network' includes any communications network over which a plurality of computer entities can communicate with each other by transfer of electronic data files. Such networks include both packet switched and circuit switched networks, and hybrids of packet switched/circuit switched networks. Examples of such networks include the internet, wide area networks (WAN's). Various protocols such as internet protocol (IP); asynchronous transfer mode (ATM); wireless application protocol (WAP) and the like may be used.

Figure 1:
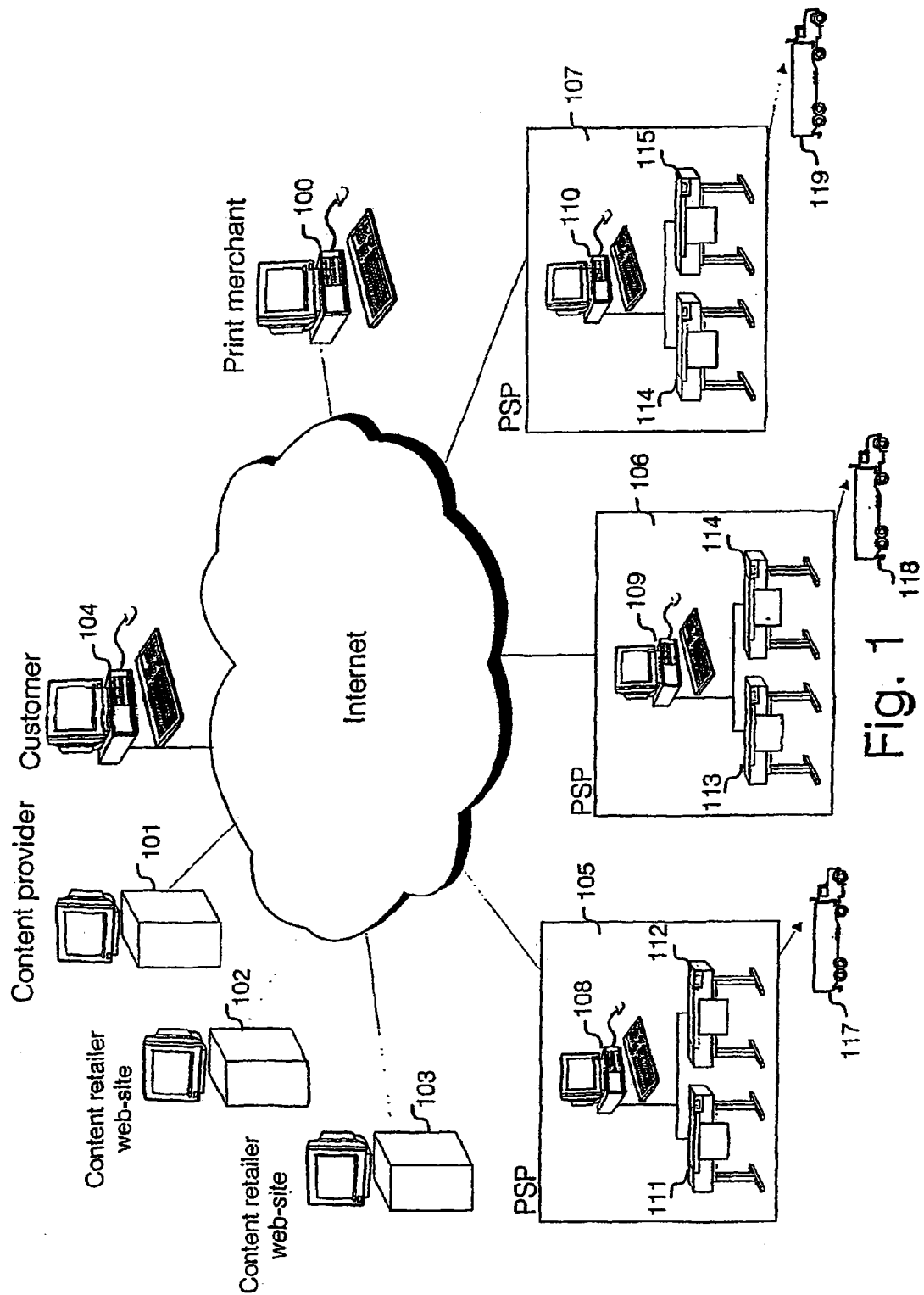
FIG. 1 illustrates schematically an on-line distributed printing network for providing efficient allocation of print services to a plurality of customers.

Referring to FIG. 1 herein, there is illustrated schematically a physical architecture of an online distributed printing network for providing printing services to a plurality of customer terminals 104, in response to a plurality of orders from customers, who may also be the end users. The network comprises a plurality of internet-enabled print service providers 105-107 each capable of providing physical prints in response to orders for printed images; an internet-enabled print merchant computer entity 100 for matching a plurality of orders for print services to the plurality of print service providers 105-107; one or a plurality of internet-enabled content provider computer entities 101 capable of providing image data; a plurality of content retailer computer entities 102, 103, each capable of receiving orders from subscribers, e.g. the general public, for printed images; and one or a plurality of courier service providers 117-119 acting to deliver physical prints to specified end users.

Individual internet-enabled businesses may be characterized by the service or product which they provide, and the type of computer entity which they utilize as follows:

A content retailer business, has a content retailer computer entity 102, 103 and provides image content on-line to customers by offering such content via a website. The customers, usually direct retail customers e.g. members of the public, using personal computers having web browsers may view web pages made available at the content retailer computer entity, and may order on-line prints of those images, using a known web site e-commerce engine for handling payment details.

A content provider business has a content provider computer entity 101, storing a plurality of image data, of interest to individuals and businesses and deliverable on-line. For example, a content provider business may provide a library of pictures, in data format, stored in a database and made accessible over the internet by a content provider computer entity 101.

A print merchant business, has a print merchant computer entity 100, and provides a service to business customers, direct retail customers, content retailer websites and content providers, as well as to one or more print service providers. For the content retailer business, the print merchant allows conversion of orders from subscribers to those content retailer business into high quality prints which can be sold by the content retailer websites, with reliability of print and delivery to end users. For the content provider website, the print merchant business offers the proposition to convert their image content into high quality posters which the content retailer website can sell direct to their on-line customers. The print merchant business handles the printing and delivery service for the content retailers business with reliability. For the print service providers, the print merchant offers capture of printing demand to keep the print service providers busy and provides assistance in managing workflow automatically to the print service provider. Print service providers are connected to print merchant 100 by their print manager computers, which act as e-servers 108-110. Each e-server allows a plurality of printing devices 111-116 to be connected to the print merchant. For the print service providers, the print merchant business offers the proposition of capturing printing demand, particularly large format printing demand for the print service providers, and providing the equipment to help the print service provider manage a print on-demand printing service to fulfil the demand, managing workflow automatically within the print service providers operation, and minimizing manual intervention.

A print service provider business comprises an on-line enabled print manager computer entity 108-110, and one or a plurality of printer devices 111-116, the print manager computer entity capable of receiving orders from the print merchant computer entity on-line, e.g. over the internet, and capable of receiving on-line image data direct from the content provider computer entity, content retailer entity, or print merchant entity.

Individual customer computer entities connect to the internet in known manner using, for example, a modem, ISDN line, or the like. It will be appreciated by those skilled in the art that whilst communications between computer entities have been described as being over the TCP/IP Internet, in the best mode, the invention is not restricted to such means of communications, but may make use of any suitable communications network or a mixture of network links, including, but not limited to, virtual private networks (VPN's), local area networks (LAN's), wide area networks (WAN's), using any suitable routing and/or transport protocols.

A customer terminal 104 may include any computer entity capable of sending an order for print products or print services to a print merchant business 303 or a content retailer business 302. Customer terminals may be categorized into two basic types: firstly, those without the facility to directly order print products or services from print merchant computer entity 100. Herein after these terminals are referred to as retail customer terminals. Secondly, customer terminals having means for ordering print products or services directly from print merchant computer entity 100 herein after this type of customer terminal will be referred to as a business customer terminal. Business customer terminals are enabled to send image data directly over an on-line communication, e.g. the internet, to print service manager computer 100, as well as give orders for print products and services. Retail customer terminals typically comprise a personal computer or the like, equipped with a web browser as are known in the prior art. A retail customer terminal may include a special terminal having a touch-sensitive screen, and dedicated application software to drive the touch-sensitive screen, provided at a retail location, whereby members of the public may order print products using the touch-sensitive screen, which orders are then communicated on-line to a print merchant computer entity. Instead of using an internet browser, the special application software replaces the browser and is configured to be easier to navigate than a browser by members of the general public.

Content provider computer entity 101 comprises a database storing a plurality of digital image content data representing a plurality of images, and an internet compatible communications interface, making available the digital image content data over a communications link.

Print merchant computer entity 100 comprises a server computer capable of communicating on-line with the plurality of print service providers 105-107, one or a plurality of content provider computers 101, one or a plurality of content retailer computer entity 102,103, one or a plurality of business customer terminals, and optionally one or a plurality of server computers belonging to one or a plurality of respective courier businesses.

Figure 2:
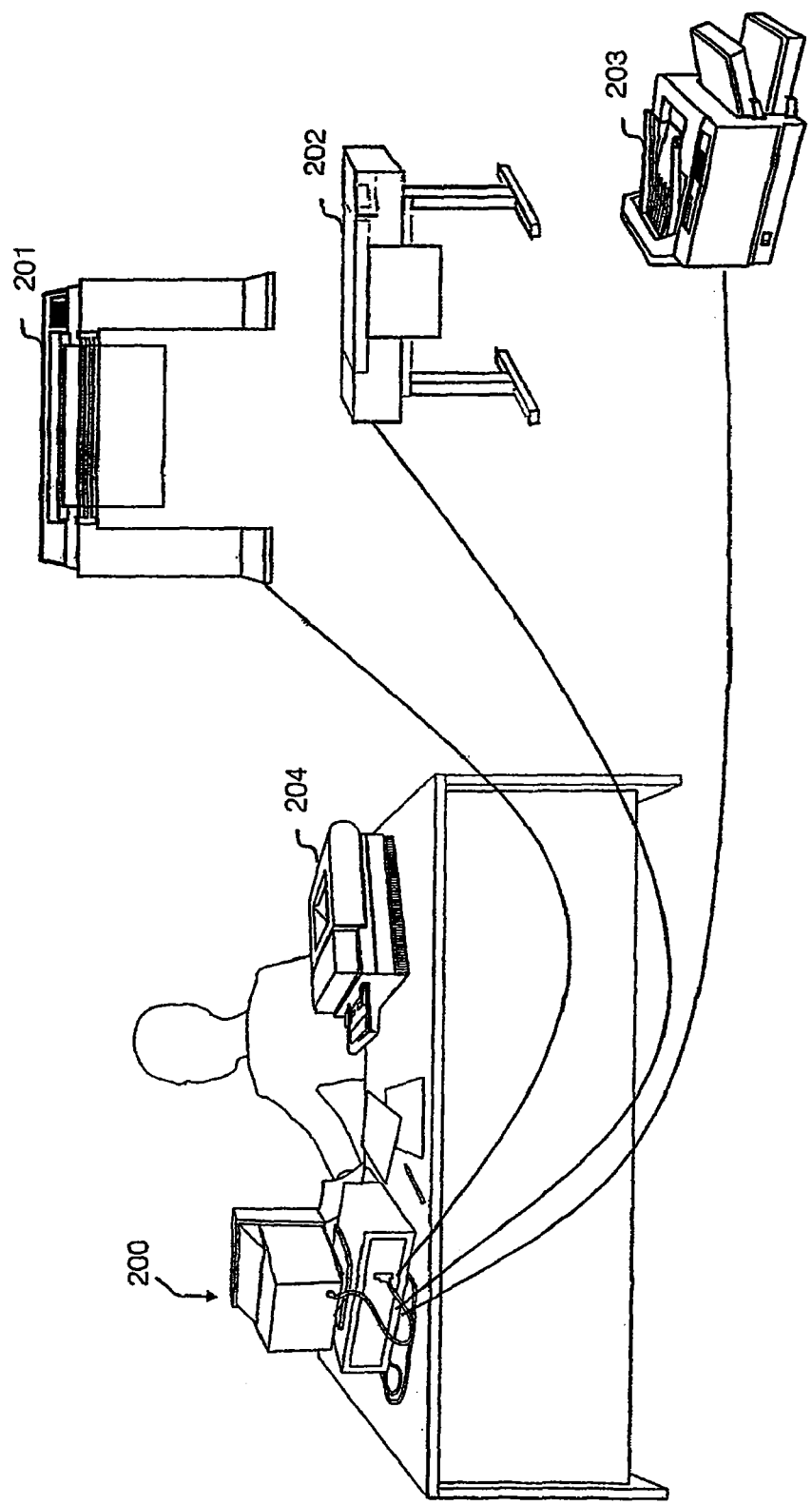
FIG. 2 illustrates schematically a physical view of part of an internet enabled print service provider business according to a specific implementation of the present invention.

Referring to FIG. 2 herein there is illustrated schematically a view of one example of a print service provider facility 105. Print service provider facility 105 comprises at least one print manager computer entity 200, one or a plurality of printer devices 201-203 for printing out print products encompassing images received via print manager 200, the plurality of printers printing out under control of print manager 200 which automatically allocates print jobs to individual printers, depending upon a media type loaded on the printer, and according to algorithms for efficient utilization of print media and printer resources. Additionally, the print service provider facility comprises a finishing department, not shown in FIG. 2, for applying special finishes to print products, for example lamination, gloss finishes or the like; and a shipping department for packaging orders of print products into packaging, for example roll tubes, boxes or plastics, envelopes.

The plurality of printer devices 201-203 may provide a selection of different printer devices capable of handling different sizes of print media. Each printer device receives instructions for printing of images, as well as image data itself from the print manager computer 200 according to print orders received over the internet by print manager computer 200. Print manager 200, additionally prints out instructions to human operators, in the form of paper work order sheets and packing slips containing labels, to enable human operators to collect print products from the plurality of printer devices, and to efficiently process the print products through the finishing department and shipping department. The instructions may be printed via a locally connected peripheral printer 204, e.g. a HP LaserJet device or similar.

Figure 3:
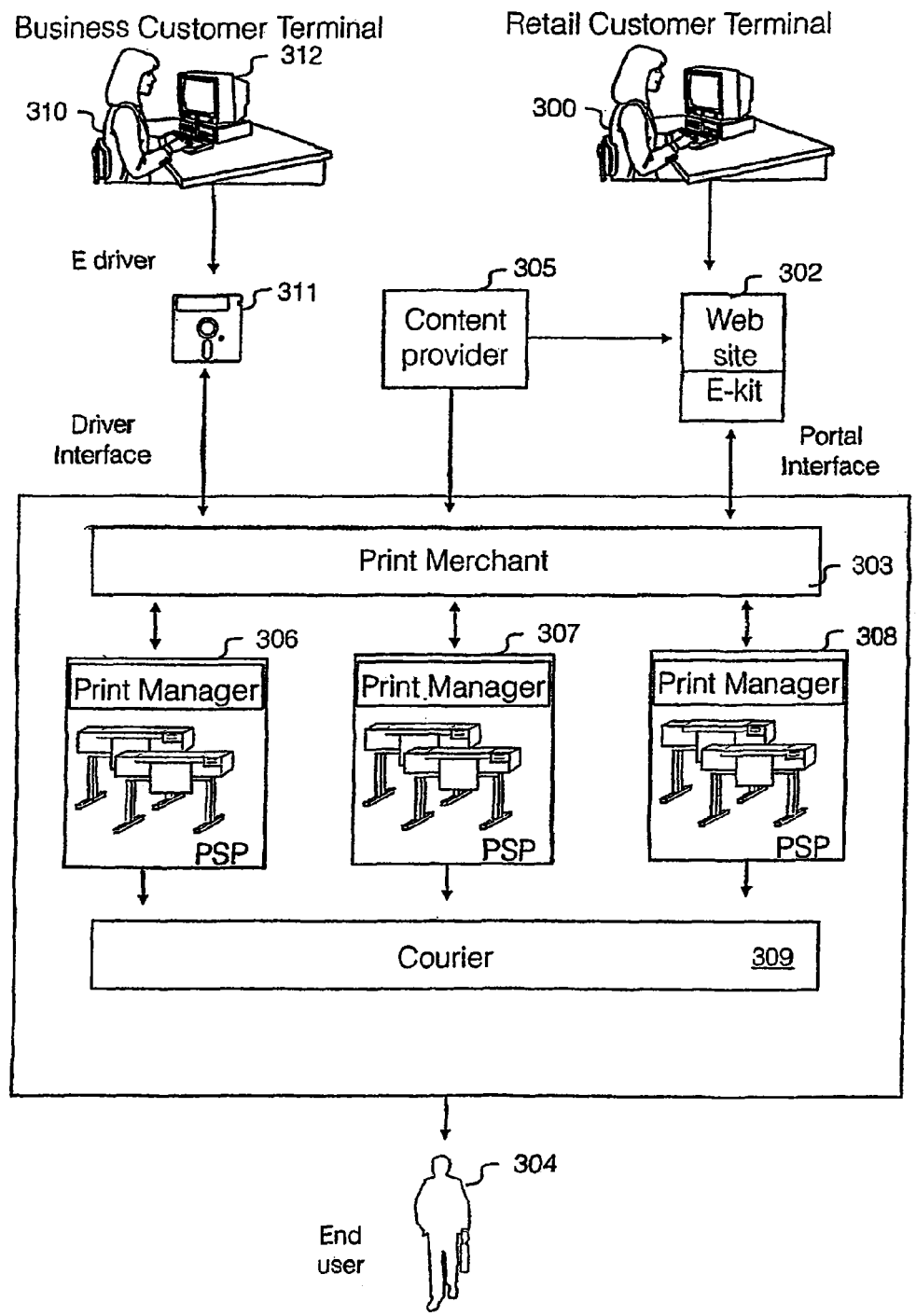
FIG. 3 illustrates schematically a logical overview of an on-line distributed printing network according to the specific implementation of the present invention.

Referring to FIG. 3 herein, there is illustrated schematically a logical architecture of the on-line distributed printing network shown in FIG. 1 herein. Various types of customer are envisaged. A first type of customer 300 (a retail customer) includes members of the general public accessing the internet by conventional manner, typically using a personal computer, or equivalent type computer 301 equipped with a conventional web browser facility or a specifically designed retail terminal having a touch-sensitive screen. The retail customer 300 surfs the world wide web to find a website 302 provided by a content retailer business. The customer selects an image content, e.g. a poster from the website, and the content retailer 302 then instructs print merchant business 303 to provide and deliver one or more posters to an end user 304 specified by the customer who may be the customer themselves, or a third party specified by the customer by placing an order at content retailer website 302. Image data for the content, i.e. the image order by the customer 300, may be provided from an internal database at the content retailer website 302, or via an external content provider 305 who may send that image data over the internet to content retailer website 302, or direct to print merchant 303, as instructed by an order from content retailer website 302 to print merchant 303.

In one mode of operation the print service provider may obtain image content data from the print merchant computer. In another mode of operation, the print service provider may obtain image content data directly from a content provider or content owner, using an address supplied by the print merchant computer entity. Having received an order from content retailer website 302, print merchant 303 selects one or more of a plurality of print service provider businesses 306-308, based upon criteria of:

Ability of print service provider to fulfil the order.
Availability of print service provider to fulfil the order.
Price quoted by the print service provider(s) for fulfilling the order.
Any other contractual terms which the print merchant business 303 holds with one or more of the print service provider businesses 306-308.

A print service provider receiving an order from print merchant 303 fulfils that order by printing the necessary print products specified in the order, and ships these to the end user 304 using a courier business 309.

A second type of customer 310 may include business customers, for example graphics design businesses, advertising agencies, architectural practices, or any professional or manufacturing service or business requiring flexible printing services, and operating graphics software packages capable of generating image data for printing in electronic format. Business customers 310 differ from retail customers 300 in that they may interact directly with print merchant business 303 by means of a driver interface 311 supplied by print merchant business 303 enabling a business customer's in-house graphics computer 312 to communicate directly with a print merchant computer entity at the print merchant business 303. Business customers 310 may generate their own image content through their in-house graphics software, which may be sent to print merchant business 303 in order to fulfil a business customer order for printed products incorporating image data supplied by the business customer.

Figure 4:
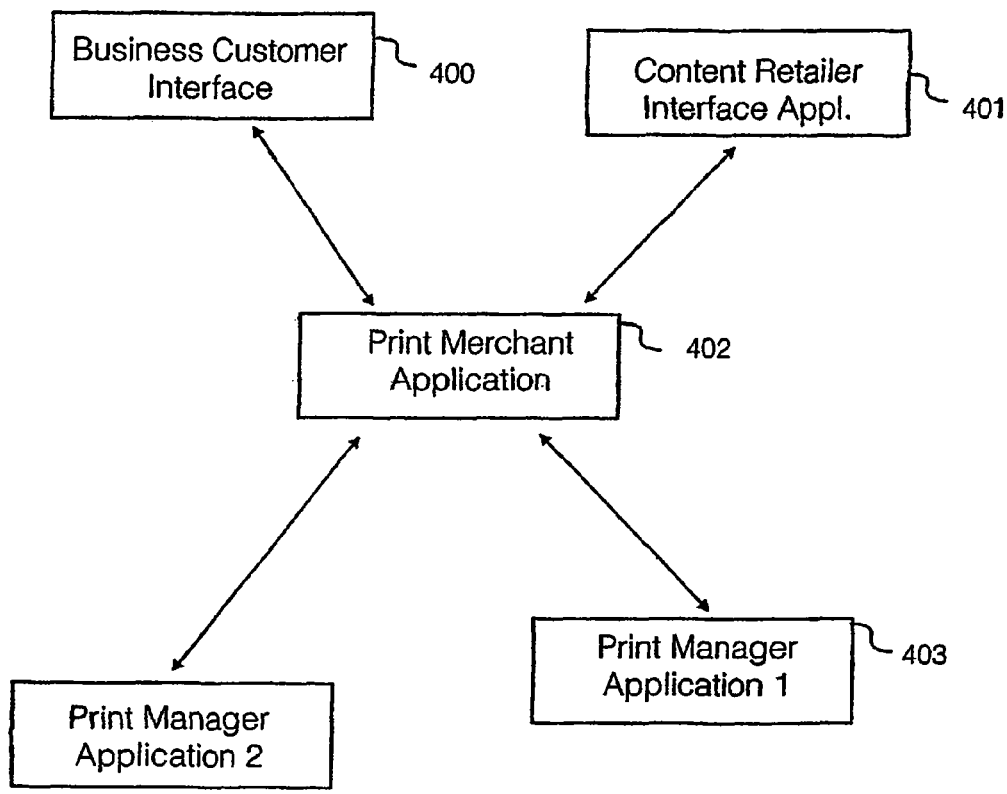
FIG. 4 illustrates schematically logical components implementing the on-line distributed print network of FIG. 1.

Referring to FIG. 4 herein, there is illustrated schematically logical components required to implement the on-line distributed printing network of FIG. 1, in one implementation. The logical components may comprise applications programs suitable for installation into conventional general purpose computers, to adapt those computers to perform the functions of a business customer terminal, a content provider computer entity, a content retailer computer entity, a print manager computer entity, and a print merchant computer entity. Logical components may include a business customer interface application 400, for interfacing with a customer's own graphics application, a content retailer interface application 401 for interfacing the content retailer computer entity with the print merchant computer entity; a print merchant application resident in the print merchant computer entity 100 for carrying out the functions of the print merchant computer entity; and a print manager application 403 resident in print manager a computer entity 107, enabling operation of that computer entity. In other implementations, the logical entities 400-403 may be provided as application specific integrated circuits in embodiments of computer entities which are not based upon general purpose computers, but are custom built. However, the logical entities are optimally implemented as applications which can be incorporated into the various computer entities.

Figure 5:
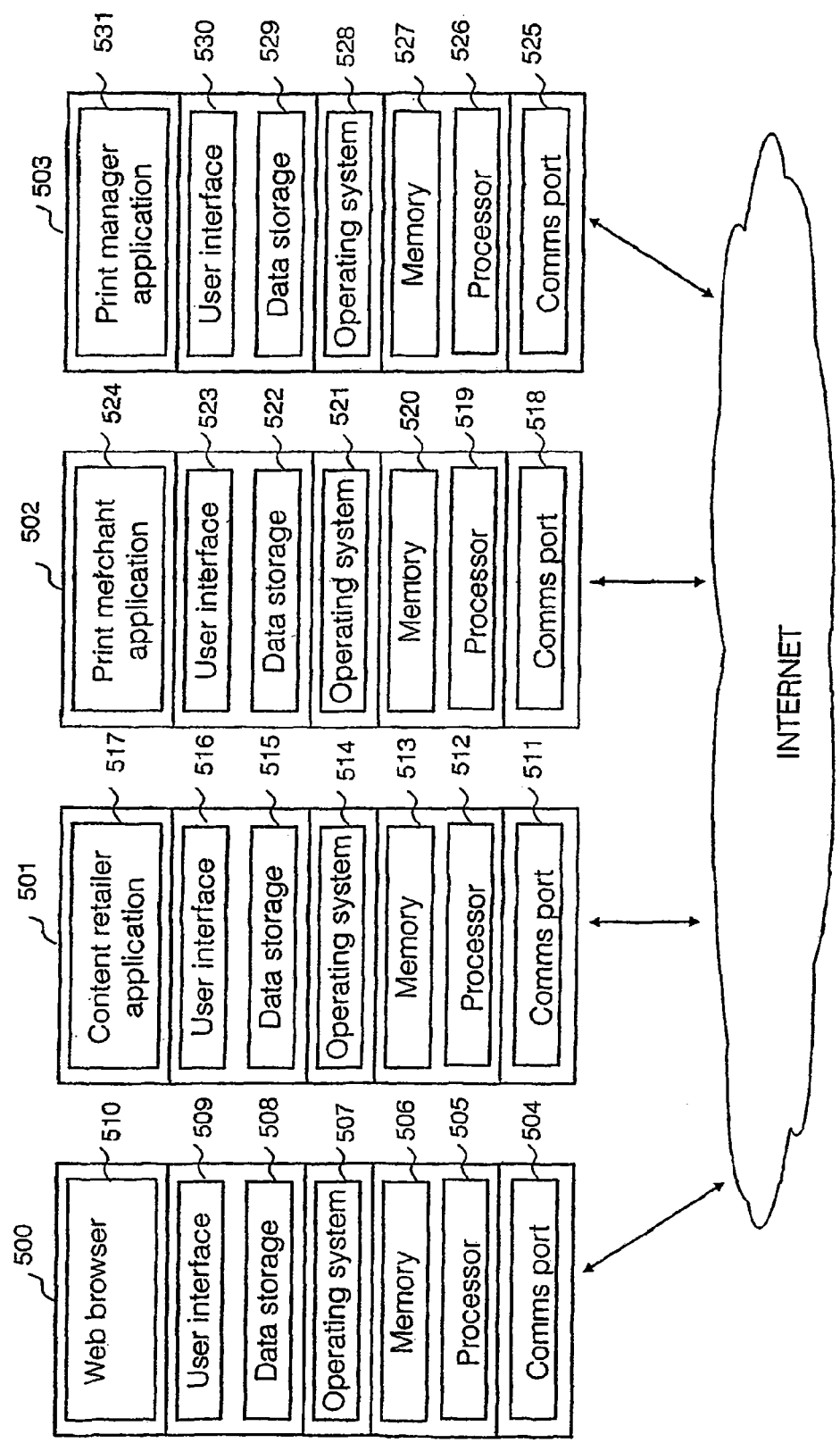
FIG. 5 illustrates schematically components of a retail customer terminal, content retailer computer, print merchant computer, and print manager computer comprising the distributed printing network of FIG. 1.

Referring to FIG. 5 herein, there is illustrated schematically components of a retail customer terminal 500, content retailer computer 501, a print merchant computer entity 502, and a print manager computer entity 503.

Retail customer computer entity comprising a communications port 504, a processor 504 with associated memory 506, an operating system 507, for example Unix®, Linux®, Microsoft NT/2000®, a data storage device 508, e.g. a hard disk drive or similar, a user interface 509 and a web browser application 510.

The retail customer computer entity, instead of a web browser, may comprise a special application designed to be user friendly, and easier to use than a web browser, for driving a touch-sensitive screen provided as part of the retail computer entity. This type of entity may be provided at retail locations, with a permanent on-line connection to a print merchant computer.

Content retailer computer 501 comprises communications port 511, a processor 512, with associated memory 513, a conventional operating system 514, a data storage device 515 and optionally user interface 516 including a visual display unit, keyboard and pointing device, and a content retailer application 517.

Print merchant computer entity 502 comprises a communications ports 518, a processor 519, with associated memory 520, an operating system 521, a data storage device 522, for example an hard disk drive or RAID array, optionally a user interface 523 including visual display unit, keyboard, pointing device, e.g. a mouse or trackball, and a print merchant application 524.

Print manager computer entity 502 comprises a communications port 525 for communicating with other computer entities on-line; a processor 526; memory 527, including random access memory and read only memory; an operating system 528, e.g. Linux®, Unix®, Windows NT/Windows 2000®; a data storage device 529 e.g. hard disk drive, RAID array or the like; a user interface 530 enabling a human operator to interact with the print manager computer, the user interface comprising a visual display unit, keyboard and a pointing device, e.g. a mouse, trackball or similar; and a print manager application 531 acting as a e-server for communicating with print merchant computer entity and for controlling locally a plurality of printer devices and other resources within a print service provider facility.

Figure 6:
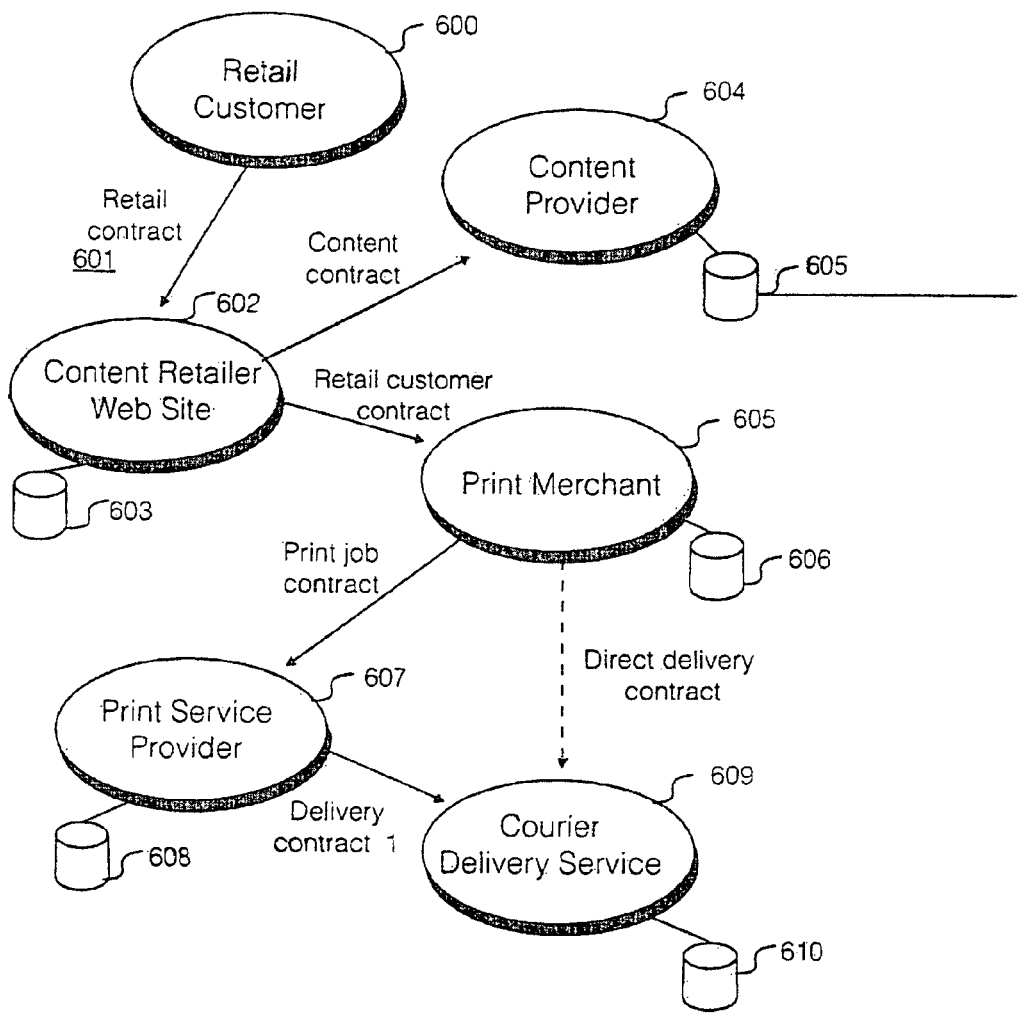
FIG. 6 illustrates schematically a contract model representing a plurality of electronic contracts between computer entities comprising the distributed printing network of FIG. 1.

Referring to FIG. 6 herein, there is illustrated schematically a contract model describing a plurality of electronic contracts held between different business entities comprising the distributed printing network of FIG. 1. In general, for the computer entities to transact with each other, the businesses operating those computer entities have pre-negotiated contracts with each other which act as a default condition, in case of malfunction of any of the computer entities, or in case of dispute. Those up front contracts may be stored as electronic data in databases at each of the computer entities, and those contracts form the basis for quotations made between computer entities, which take into account trade offs between price, volume and other business considerations. Individual electronic contracts between business entities are stored in the respective computer entities operated by those business as electronic contract data. Electronic transactions are governed according to the contracts stored in the individual computer entities. A retail customer 600 enters into a retail contract 601 with a content retailer 602 via that content retailer's website. Details of that contract are stored in the content retailers database 603 in a content retailer computer entity. Also stored in the content retailer's database 603 may be one or a plurality of contracts with one or more content providers 604 for the provision of data image content, sold through the content retailer website. A contract between a content retailer and a content provider may include data describing the following parameters:

A quantity of images to be supplied in a given time period
    A price for each image up to the quantity
    A time for delivery of an image data on-line
    One or more logical addresses of one or more print merchants, to which image data is to be transmitted on-line.

Content provider 604 may store a plurality of contracts with a plurality of content retailers in a local database 605 of a content providers computer entity. Each contract may involve data describing parameters as listed above, with the specific details of each contract differing from contract to contract.

Print merchant 605 stores a plurality of contracts with a plurality of retailer computer entities, in a local database 606 of a print merchant computer entity. A contract between a print merchant computer entity and a content retailer computer entity may include data describing parameters comprising:

Definition of print products, including:
        print media
        ink type
        finishes
        physical size of a print product
    A plurality of delivery areas for delivery of prints
    A plurality of prices based upon the above parameters
    Any special discounts to be applied to a content retailer The print merchant computer entity and the content retailer computer entity each keep a copy of a contract between that corresponding content retailer and print merchant business in their respective local databases 603, 606. In general, a print merchant business has a plurality of contracts with a plurality of different content retailer websites, the specific details of each contract differing for different content retailers. The print merchant computer entity 605 also stores a plurality of contracts with a plurality of print service providers in electronic form in the local database 606. A contract between a print merchant computer entity and a print service provider may include data describing parameters comprising:

Definition of print products, including:
        print media
        ink type
        finishes
        physical size of a print product
    A plurality of delivery areas for delivery of prints
    A plurality of prices based upon the above parameters
    Any special discounts to be applied to a print merchant
    A time period for delivery of a print product A copy of the print merchant-print service provider contract may be stored in a local database 606 at a print merchant computer entity and at a local database 608 at a print manager computer entity of a print service provider. Each print merchant entity has a plurality of different contracts with a plurality of different print service providers. Similarly, each print service provider may have a plurality of different contracts with a plurality of print merchants. A print service provider can have more than one contract with a single print merchant.

Each print service provider may have a plurality of contracts with a plurality of courier delivery services 609. A courier delivery service may be provided with a courier delivery service computer entity for accepting orders electronically. An electronic contract between a print service provider and a courier delivery service entity may be stored in a local database 608 of a print manager computer entity as well as a local database 610 of a courier service delivery computer entity. An electronic contract between a print service provider and a courier delivery service may comprise data describing the following parameters:

A set of delivery areas covered
    An amount of weight which packages can be
    A packaging type which can be sent
    A type of delivery, e.g. 24 hours, 48 hours etc.
    A cost for delivery In a further implementation, a print merchant 605 may have an electronic contract with one or a plurality of courier delivery services 609, as well as contracts with a plurality of print service providers, and content retailers 602. Print products may be delivered by a courier delivery service under a contract with the print merchant, rather than under a contract directly with a print service provider 607.

Figure 7:
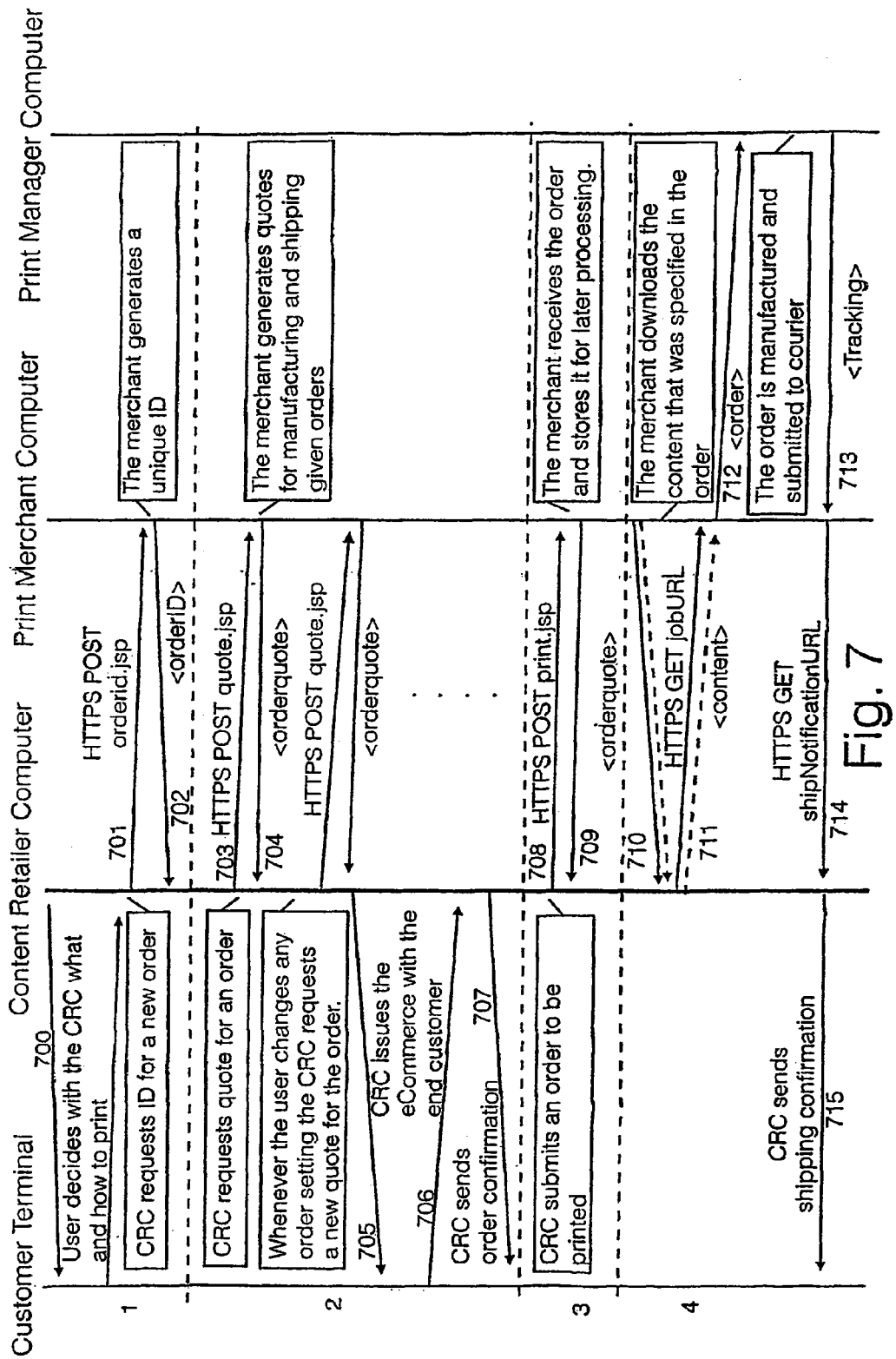
FIG. 7 illustrates schematically a method of operation of a plurality of computing entities comprising the distributed printing network of FIG. 1, communicating to transact and fulfil an order for print products on-line.

Referring to FIG. 7 herein, there is illustrated schematically a method of operation of a plurality of computer entities communicating on-line to fulfil a demand for print products from a retail customer at a retail customer terminal, by supplying printed products from a print service provider operating a print manager computer entity as described herein above, the customer selecting a printed product from a content retailer website operating a content retailer computer as described herein, and the service being provided via a print merchant operating a print merchant computer as described herein before.

The process in FIG. 7 illustrates particularly operation of the print merchant computer entity 100, and a content retailer computer entity 102 and interaction between the content retailer interface application 401 and print merchant application 402 to secure and supply an order for one or more print products. In step 700, a retail customer locates a content retailer website, and interacts with the website to order one or more print products. The user fills in text fields presented by the content retailer website, describing the order. Data collected by the website may comprise:

Media type, describing the type of media in which the print product is to be printed, including:
the ink type, e.g. outdoors, indoors, or textile
type of media sheet material
a width and height dimension of the media
Number of copies of print products
A shipping address to send the print products to
A URL address of the retail customer terminal to send confirmation of shipping to
A contact email address
A contact telephone number
A name of person to deliver the print products to The website sends the collected data from the print merchant. Additionally, the website may generate data and send this to the print merchant including:

A content identification data identifying a content of an image to be printed
A description of the print product in text format
A price at which the retail customer has ordered the print product from the content retailer business.

Communication between the customer terminal, content retailer computer, print merchant computer and print manager computer is by way of transfer of XML files using the HTTP protocol. Basic types of messages being are sent include:

Order identifications
Orders
Quotes
Notifications

Whenever a customer, via their customer terminal, wishes to place an order with the content retailer website, the content retailer website builds an order document in XML, which defines the customer's order, and which is sent to the print merchant computer. The content retailer computer requests an order identification from the print merchant computer to identify the XML order document. The order identification acts as a reference for that transaction. The content retailer computer may then request a quote for satisfying the order from the print merchant computer. Any changes made to the specification of the order by the customer via the customer terminal may result in the content retailer computer requesting one or more further quotes from the print merchant computer, as the specification of the order changes. In a request for quote, the content retailer computer sends all parameters defining how the order has to be satisfied, including details of how the print products are to be manufactured and where they are to be shipped to. The print merchant computer responds with a price quotation message, representing the price which the print merchant will charge the content retailer for satisfying the order. The content retailer website, optionally may quote the price from the print merchant computer directly to the customer, in which case the content retailer computer may add a mark up or fixed cost from the content retailer for providing the service. Alternatively, the content retailer may quote a single price to the customer without a breakdown analysis.

The content retailer computer sends an order identification message orderid.jsp to the print merchant computer, requesting an order identification code orderid, which the print merchant computer sends to the content retailer computer. The order identification code is treated as being valid by the print merchant computer for a predetermined time, typically for example 24 hours from its generation. Any orders received by the print merchant computer using that order identification code after the predetermined time will be rejected as being invalid. An order identification code forms the basis for any transaction between a content retailer computer entity and a print merchant computer. Without a valid order identification code, no quoting of prices by the print merchant computer, or submission of orders by the content retailer computer can occur. Any communication received by the print merchant computer which has an invalid order identification will be rejected, and will generate an administrative alert at the print merchant computer entity. On receiving an invalid order identification code, print merchant computer sends a notification to the content retailer computer to which the order identification code was issued, and human support operators at the print merchant computer request human intervention at the content retailer business, to fix the problem of received orders having invalid order identification codes. If an invalid order identification code is received by the print merchant computer, then this is indicative of a malfunction at a content retailer computer.

In step 703 the content retailer computer requests a quote for an order for print products which it has received from a retail customer, and sends a quotation message quote.jsp to the print merchant computer. The print merchant computer provides a real-time quoting mechanism, which gives accurate manufacturing and shipping quotes to the content retailer computers. The quote.jsp ordering message prompts the print merchant computer to generate a quotation for the specified order. On receiving a quotation for an order, the content retailer computer adds a royalty or mark-up, and then presents the final result as a sale price to the retail customer via the content retailer computer' website.

Some content retailer computers may be configured to set their prices quoted to retail customer using estimates of prices stored in the retailer customer contract in database 603 of that content retailer. However, if a content retailer computer does make an estimate on this basis, and the contract is not a latest version, then the content retailer computer could find that a price quoted by the print merchant computer is higher than expected. Where a content retailer computer makes an estimate to a customer terminal, then the step 703 of requesting a quote from the print merchant computer, and receiving that quote in step 704 is unnecessary. Whenever a customer changes any order setting on the content retailer website interface, the content retailer computer repeats steps 703 and 704 to obtain a new quotation from the print merchant computer. In step 705 the content retailer computer displays its own quotation to the customer terminal, and in step 706 the customer accepts the quotation by the content retailer computer and sends an order message to the content retailer computer. The content retailer computer sends an order confirmation back to the customer terminal in step 707.

Content retailer computer returns control to the user browser immediately after displaying an order confirmation summary page to the customer terminal. The content retailer computer submits an order to the print merchant computer after displaying the order confirmation to the customer terminal. Normally this would run as a separate thread from content retailer computer to print merchant computer in order to avoid blocking the website displayed by the content retailer computer, waiting for a response. However, in a best mode, a pull transfer mode for content retailer computer content is used. That is the content retailer computer communicates to the print merchant computer where to download content from. The print merchant computer may then obtain content from a content provider computer 101. This approach allows the print merchant computer to perform download queue management, error auto recovery, caching, and avoid network congestion, whilst simplifying implementation requirements for the print merchant application 402. Because of the pull mode, the print merchant computer may run a simple CGI after the transaction with the customer terminal, which submits an order in step 708 to the print merchant computer. Because no large data transfers are involved in the order submission between the content retailer computer and the print merchant computer, there is no need for a content retailer computer server task which submits orders in the background. Content retailer computers submitting orders to the print merchant computer will receive a quote document as a reply in step 709. This quote document will reflect the exact amount that the print merchant computer will charge the content retailer computer for processing the submitted order. When this quote document is received by the content retailer computer, it can check that the previously quoted price in step 704 is the same as that in the quote document received in step 708. The content retailer computer sends a HTTP POST request print.jsp instructing the print merchant computer to print an order. This consists of an XML electronic document which contains a plurality of all order settings needed by the print merchant computer to process the order for print products. In response to the POST message, the print merchant computer returns an XML document which contains the price quotation for the given order. The quotation provides an accurate manufacturing and shipping price estimate to the content retailer computer, taking care of media size, number of copies, media weight, shipping destination and other order parameters. If the content retailer computer did not change the details of the order, but the two quotes do not match, then this is indicative of a problem, and this may raise an alert signal at the content retailer computer. The returned quote document received by the content retailer computer in step 709 is used by the content retailer computer where the content retailer computer has made a quotation to a customer terminal based upon the stored contract data in the contract between the content retailer and print merchant computers if the received quote from the print merchant in step 709 is higher than initially expected, this may give rise to an alarm situation at the content retailer computer. Irrespective of whether the order from the print merchant computer is higher than expected or not, the content retailer computer is bound by its quotation given to the customer terminal and must fulfil an order from the customer terminal, even if this is unsatisfactory or loss making to the content retailer.

The print merchant computer selects a print manager computer according to an algorithm stored within print merchant application 402. Once the print merchant computer has selected a print service provider and the print service provider has accepted the order, the print merchant computer downloads the content specified in the order document from the content retailer computer. Content need not be downloaded immediately, but ideally is downloaded within 24 hours of receiving the order. The content can be downloaded from the content retailer computer itself in step 711, where the content retailer computer obtains content from content provider 604, or can be downloaded directly from the content provider 604 by the print merchant 605. Content should be stored at the print merchant computer until either successfully downloaded to the print manager computer, or until a timeout has expired. For content retailer computers which generate content such as maps, genealogy, charts, the content itself may be generated on demand by the content retailer computer from data stored in a local database, upon receiving a proper GET-jobURL request from the print merchant computer. Therefore, the content retailer computer may not need to increase its storage capacity to accommodate 24 hour perishable content for on demand printing. However, the content retailer computer may need to include a custom graphics interface for on-demand generation of content.

In step 712, the order is sent electronically to the print manager computer from the print merchant computer. The print manager computer processes the order by manufacturing print products according to the order and ships these to the end user. In step 713, the print manager computer sends tracking message to the print merchant computer enabling tracking of the shipment of print products to the end user. The print merchant computer relays a shipping notification message to the content retailer computer, which can then send a shipping confirmation message in step 715 to the customer terminal, telling the retail customer when their order will be shipped to the end user.

Figure 8:
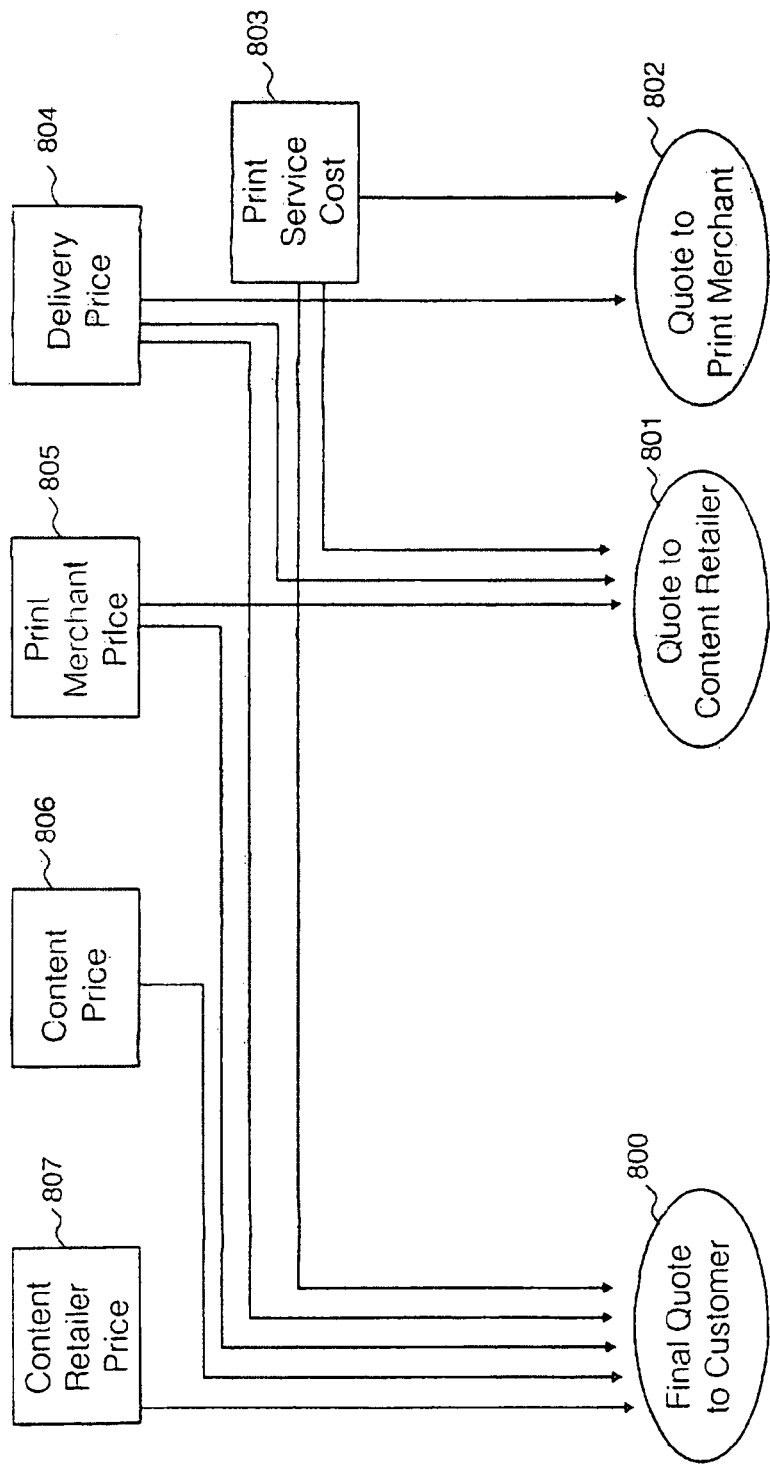
FIG. 8 illustrates schematically components of a quote to a customer made by a content retailer computer.

Referring to FIG. 8 herein, there is illustrated schematically how a final quote to a customer 800, a quote to a content retailer 801 by a print merchant, and a quote to a print merchant 802, by a print service provider are made up. Quote 802 to the print merchant is made up of a print service price charged by a print service provider, and a delivery price 804 charged by a courier. The delivery price 804 may itself form the subject of a quote to a print service provider by a courier. A quote 801 to a content retailer by a print merchant is made up of the quote to the print merchant 802 comprising the print service price 803 and delivery price 804, and additionally a print merchant price 805 charged by the print merchant. A final quote 800 to a customer made by a content retailer is made up of the quote to the content retailer 801, including the print merchant price, delivery price, and print service price, as well as a content price 806 which is optionally included where the content retailer website obtains content from an independent content provider, and a content retailer price 807 levied by the content retailer.

Each price comprises a cost, plus a margin or mark-up added by the relevant business. In one implementation, the final quote to the customer may be presented to the customer in the form of a price charged by the content retailer, with a delivery price itemized separately to the customer.

Figure 9A:
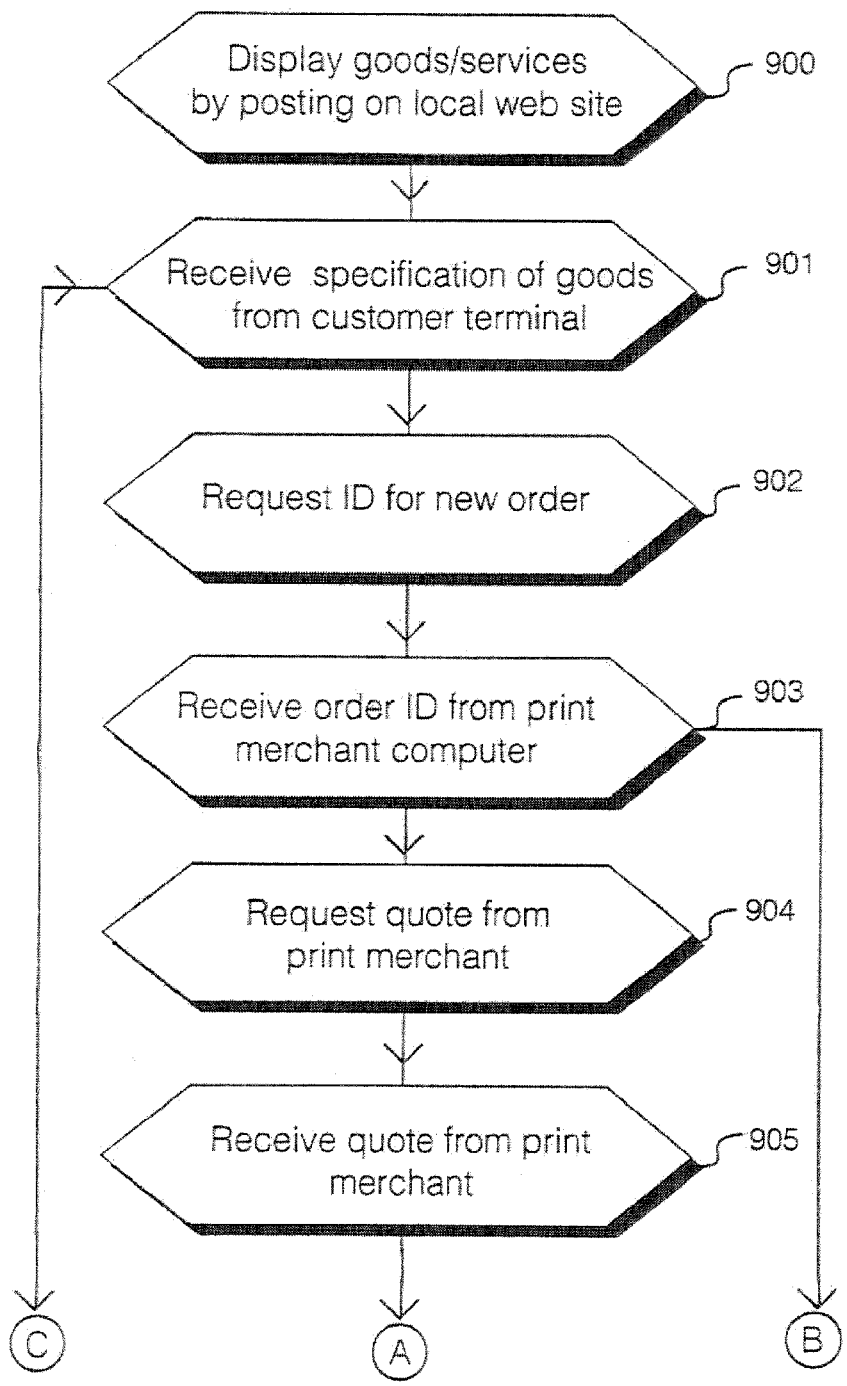
FIG. 9A-9B illustrate schematically a mode of operation of a content retailer computer entity for receiving an order from a retail customer terminal, and satisfying that order by issuing an order to a print merchant computer entity.
Figure 9B:
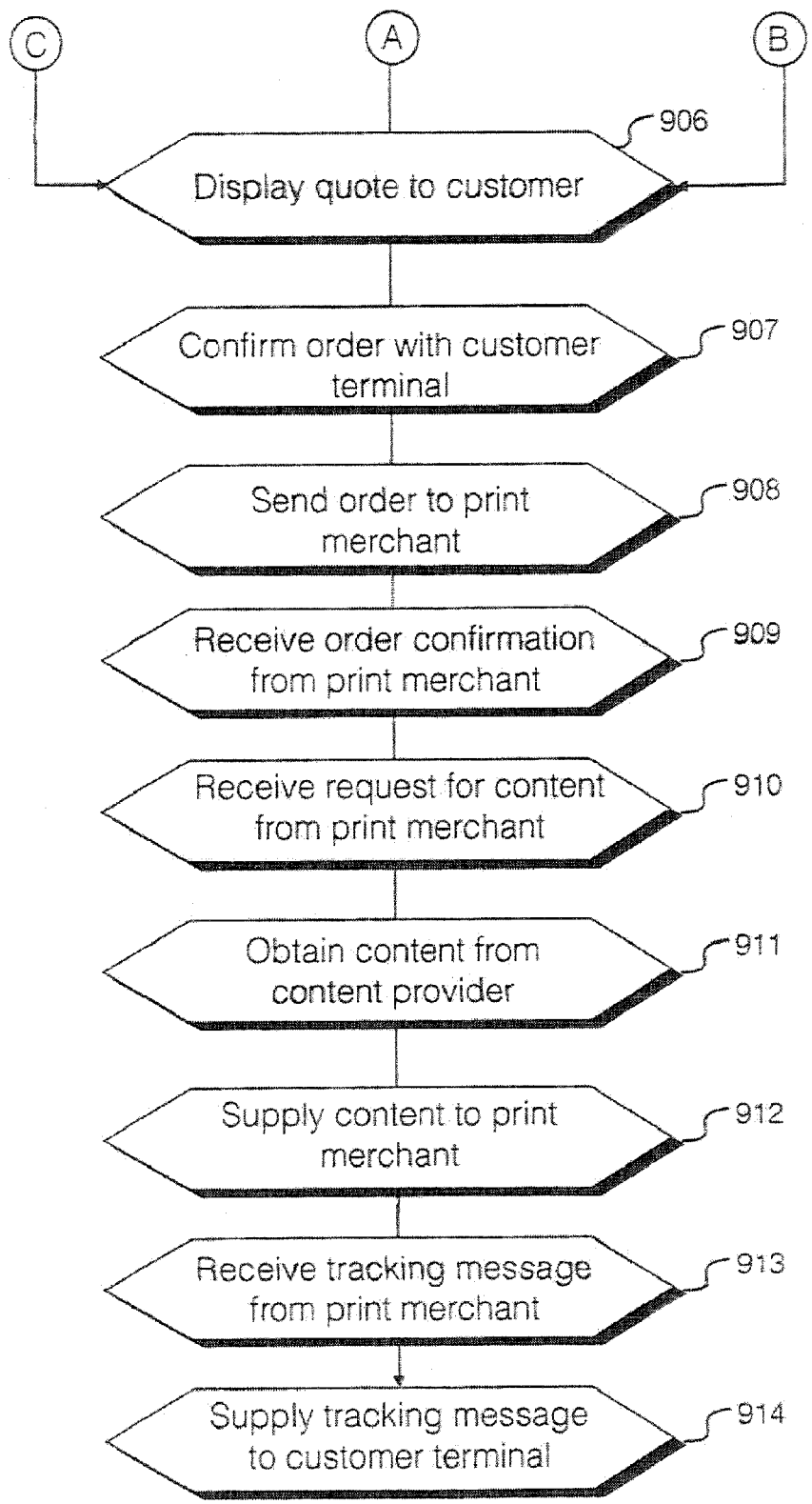

Referring to FIG. 9A-9B herein, there is illustrated schematically a mode of operation of a content retailer computer interacting with a retail customer via a displayed website, accepting an order for print products, and satisfying that order by placing an order with a print merchant to supply print products to the retail customer. In step 900, the content retailer computer displays goods and services by posting a visual description of those goods and services on a webpage. A retail customer 300 viewing the website through a customer terminal 121 browses the website and selects print products for purchase. The customer specifies the goods at the customer terminal, and a description of those goods is received by the content retailer computer in step 901. In step 902, the content retailer computer requests an identification for an order from a print merchant computer. In step 903, the content retailer computer receives an order identification code from the print merchant computer. This order identification code identifies a particular order uniquely. Optionally, in step 904 the content retailer computer requests a quote from the print merchant. The request for quote includes details of the print order itself including number of copies, media type, delivery address. In step 905, the content retailer computer receives a quote from the print merchant after the print merchant has generated such quote. In step 906, the content retailer computer displays a quote to the customer terminal. The quote displayed to the customer terminal, in general, differs from the quote made by the print merchant to the content retailer. The content retailer computer adds a cost of content, which the content retailer computer can calculate from a contract with a content provider computer, stored in a local database of the content retailer computer, and also adds a mark up, or premium cost charged by the content retailer itself, to arrive at the quote to the customer. In step 907, the content retailer computer confirms the order with the customer terminal, by the customer activating an order placement icon displayed on the website and viewable via the browser on the customer terminal at the user interface 509 on the customer terminal. In step 908, having received the customer order, the content retailer computer sends an order to the print merchant computer. The order to the print merchant computer which is in XML file format sent in HTTP, specifies parameters including:

an identification of the content retailer computer
date
specification of print products
delivery address
cost In step 909, the content retailer computer receives confirmation of its order from the print merchant, once the print merchant has received and accepted that order. In step 910, the print merchant may optionally request content from the content retailer computer, where a separate source for obtaining the content has not already been specified in the order received from the content retailer computer. Under these circumstances, in step 911, the content retailer computer obtains content from an external content provider, which the content retailer has a contract with, or alternatively generates the content from an internal database at the content retailer. The content is supplied to the print merchant in step 912 by the content retailer computer. In step 913, after the print merchant has arranged shipping of the print product, and is processing the production of the print products, the print merchant generates a tracking message, and sends this to the content retailer which is received in step 913. The tracking message, which comprises an XML file and may specify details such as:

description of print products
confirmation of shipping address
a date order received
an approximate date of delivery.

In step 914, the tracking message may be relayed by the content retailer computer to the customer terminal, allowing a customer to track the progress of their shipment of print products to the end user, which may be the customer themselves.

Figure 10:
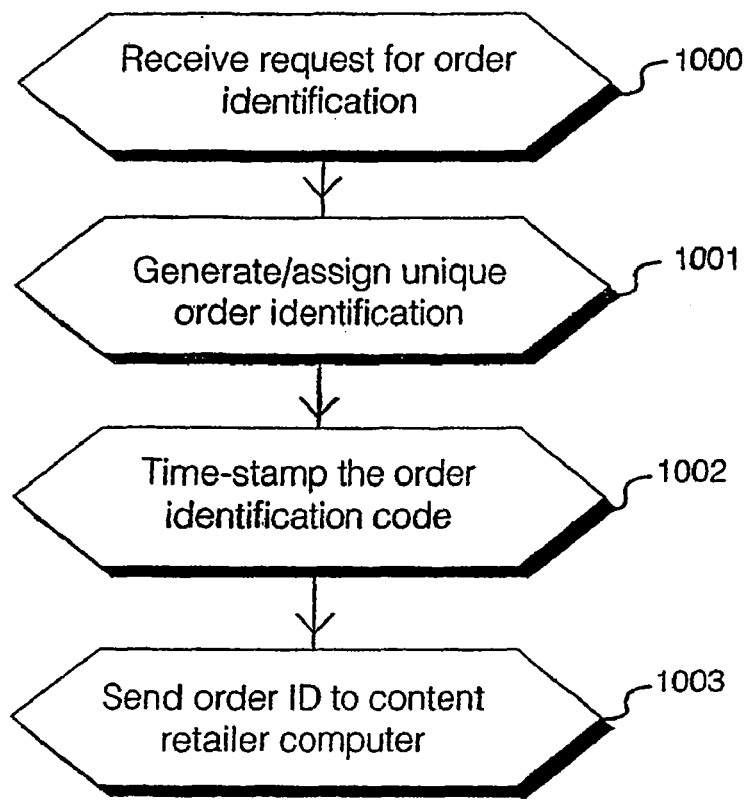
FIG. 10 illustrates schematically a first mode operation of a print merchant computer entity for allocating identifications to received orders.

Referring to FIG. 10 herein, there is illustrated schematically steps carried out by print merchant computer entity 100 according to first mode of operation of the print merchant computer. In step 1000, the print merchant receives requests for an order identification from a content retailer computer. In practice, the print merchant computer will receive a plurality of requests for order identifications from a plurality of content retail computers and will continue to receive such orders as an ongoing process. The process referred in FIG. 10 relates to dealing with one such request. In step 1001, the print merchant computer generates a unique order identification and assigns that to the request received by a particular content retailer computer. All order identifications are time stamped, and stored locally at the print merchant computer. If an order is received with an outdated time stamp from an external content retailer computer, the print merchant computer will refuse to transact according to that ID number. In step 1003, the identification code is sent to the content retailer computer over a communications link.

Figure 11:
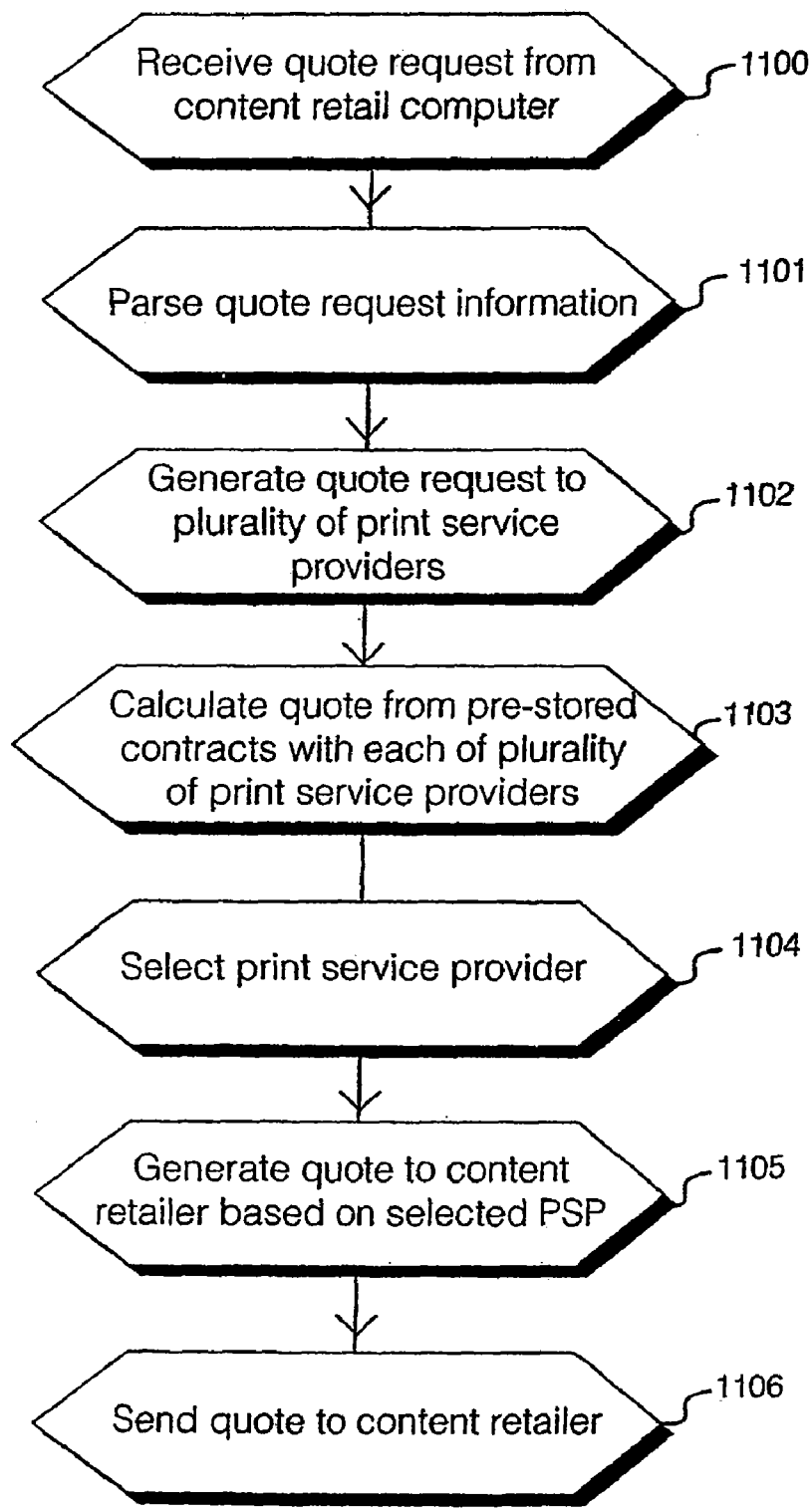
FIG. 11 illustrates schematically a second mode of operation of a print merchant computer entity for production of quotations to other computer entities.

Referring to FIG. 11 herein, there is illustrated schematically a second mode of operation of the print merchant computer for sending a quote to a content retailer computer. In step 1100, the print merchant computer receives a request for a quote from the content retailer computer. The request for quote is received in the form of an XML document, sent over HTTP. In step 1101, the print merchant computer parses data from the request for quote, defining an order from the content retailer computer. In step 1102, the print merchant computer generates a quote request and sends this to a plurality of print service providers, which have previously arranged contracts with the print merchant. Alternatively, in step 1103 the print merchant may calculate a quote based on data stored in a plurality of contracts pre-stored for each of a plurality of print service providers. In step 1104, having received quotes, or calculated a quote in accordance with a set of pre-stored contracts, the print merchant computer selects one of the print service providers to fulfil the order. In step 1105, the print merchant computer generates a quote to the content retailer computer based upon the selected print service provider to be used. The print service provider is not necessarily selected on the basis of lowest cost but is selected on the basis of availability, delivery time, cost, and contractual provisions stored in the contract of that print service provider with a print merchant. In step 1105, the print merchant computer generates a quote to the content retailer computer, based upon the price quoted by the selected print service provider or a cost calculated in accordance with the contract of that print service provider. In step 1106, the print merchant sends the quote to the content retailer computer over the communications link.

Figure 12:
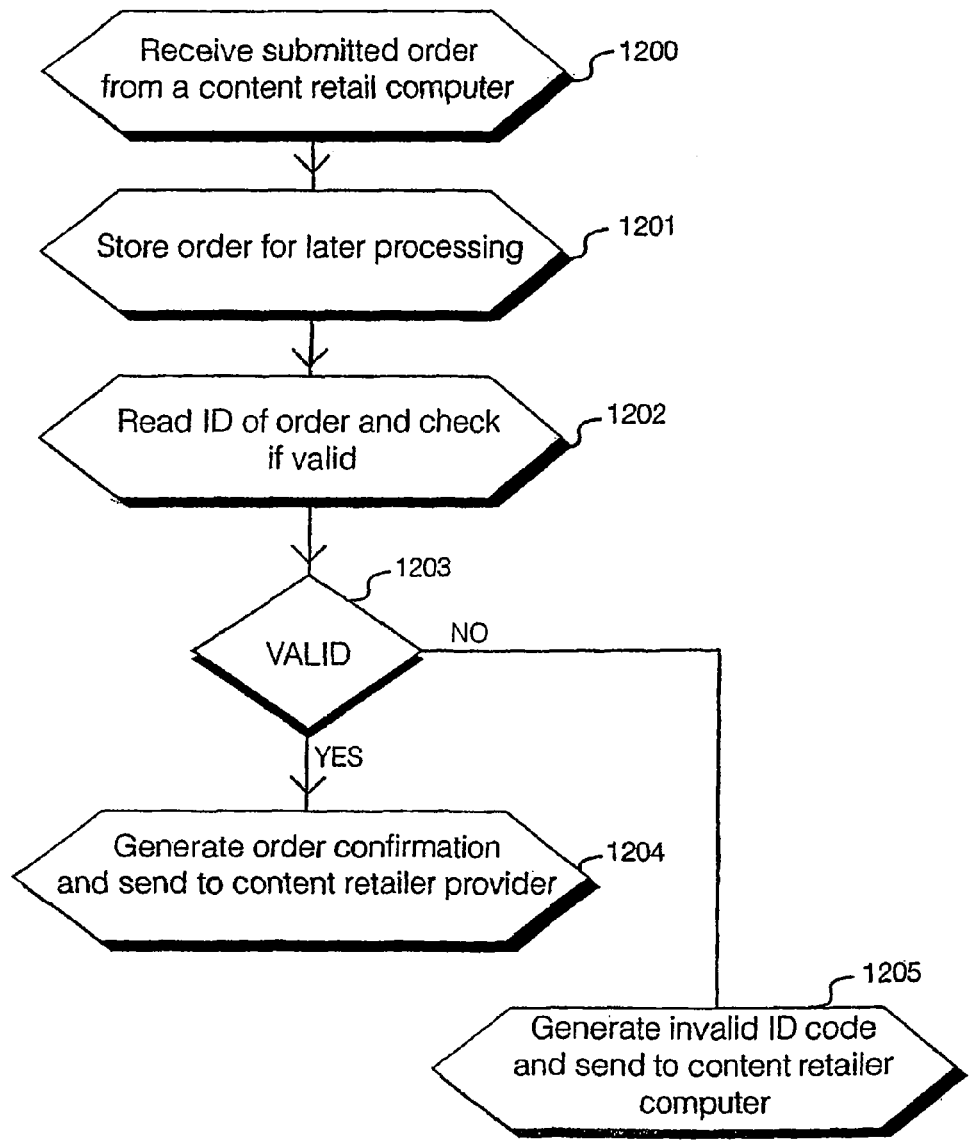
FIG. 12 illustrates schematically a third mode of operation of a print merchant computer for receiving orders and checking that orders contain valid order identification codes.

Referring to FIG. 12 herein, there is illustrated schematically a third mode of operation of the print merchant computer entity. An order is received from a content retailer computer in step 1200, which is stored for later processing by the print merchant computer in step 1201. In step 1202, the print merchant computer reads the identification code of the order and checks if it is valid, The time stamp on the received identification code is checked to see if the identification code has expired in step 1203. If the identification code is valid, then in step 1204 the print merchant computer generates an order confirmation message and sends this to the content retailer computer, to confirm receipt of the order. If, however, in step 1203 the identification code was found to be invalid, then in step 1205 the print merchant computer generates an invalid identification code message and sends this to the content retailer computer.

Figure 13:
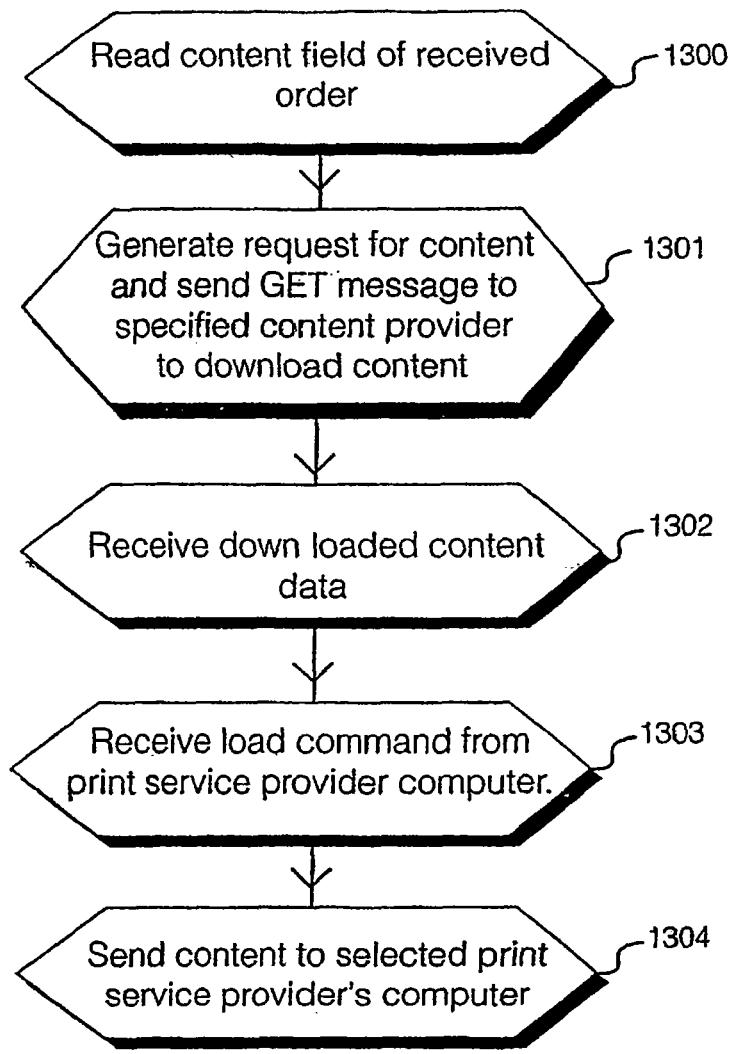
FIG. 13 illustrates schematically a fourth mode of operation of a print merchant computer for obtaining image data content on-line.

Referring to FIG. 13 herein, there is illustrated schematically a fourth mode of operation of the print merchant computer for obtaining content and sending the content to a selected print manager computer. In step 1300, the received order message from the content retailer computer is read, and a content field data is read, describing an image data content, and an address from which to obtain the image data content. The address can be the address of the content retailer computer itself, or can be the address of a content provider computer. In step 1301, the print merchant computer generates a request for content and sends a GET message to the specified content provider, or the content retailer computer, to instruct that computer to download content over the communications link. In step 1302 the print merchant computer receives the downloaded content data from the content provider computer or content retailer computer as appropriate, and in step 1303 the print merchant computer receives a "load" command from the print service provider once the print service provider has accepted the order. The print merchant computer has a queue of content data waiting to be loaded by the print managers, which is downloaded in response to load requests made by the print managers. The print merchant sends the content to a print manager computer of a selected print service provider, for production of print products according to that content data in step 1304.

Alternatively, the print manager computer at the print service provider may obtain the content data directly from a content provider, in response to an address of a content provider, content owner, or content retailer, provided by the print merchant, once the print service provider has accepted an order for print products. Whenever a print manager computer completes an operation, this is automatically communicated to the print merchant computer, so that the print merchant computer keeps a record of a status of each order which is being processed through the whole system.

Referring to FIG. 14 herein, there is illustrated schematically an OrderTicket electronic document which is used in server-to-server transactions between computer entities. The OrderTicket comprises an XML document which is submitted to the print merchant computers by one or more content retailer computers using an HTTPS POST request.

The structure of the XML OrderTicket is illustrated schematically in FIG. 14 herein.

Referring to FIG. 15 herein, there is illustrated schematically a description of the ordered control section comprises a version attribute 1500 which identifies a version of the OrderTicket. The version attribute identifies previous versions of OrderTickets, and allows the print merchant computer to recognize orders received from computer entities operating current or previous versions of software. An order identification attribute orderID 1501 is the print merchant computers identification of an order. A portal identification attribute portalID 1502 identifies a computer entity from which an order originates. This information is also used for job tracking, and for business-to-business accounting. For security reasons, all computer entities dealing with a print merchant computer will have an associated portalkey data which is used as a password for transactions. Optionally, content retailer computers can set a customized identification customerID to any identification data they would like to keep track of. This may be shown on an order packing slip as a product identification. Computer entities dealing with a print merchant computer can also specify a custom note data customNotes. This data may be printed in a footer of an order packing slip so that the packing slip can be used for gift dedications, special instructions or the like. Content retailers may set up an optional currency field 1506, in which any quotes are converted and reported in a requested currency. Currency codes are specified as numeric values according to ISO4217.

Referring to FIG. 16 herein, there is illustrated schematically components of field 1402 defining a section of the order ticket specifying the characteristics of a job to be printed. The field 1402 comprises a job price field 1600. The job price field defines in data an amount of money a manufactured print product will cost per copy to an end user. A job type field 1601 specifies a type of data of the print job, and must match one of a plurality of types of data supported by the print merchant computer. A JobURL field carries a URL suited for content download. Optionally, a lower resolution image may also be provided by means of a PreviewURL 1603 for order submission. This may be a medium size preview image. The content retailer computer must give an identifier in a ContentID field 1604, and a description of the content in text which briefly describes the image data content in ContentDescription field 1605.

Three types of image are handled, these being high resolution image data, used for making the actual print products; medium resolution image data used for previews, and a low resolution image data used for small sized pictures ("thumbnails"), of approximately one or two centimetres width and height, which are printed on packing slips and work order sheets at the print service provider. The thumbnail images can be automatically generated by the print merchant computer based on a higher resolution image data which is provided, either the preview image data, or the higher resolution image content data.

Referring to FIG. 17 herein, there is illustrated schematically a how to print section 1403 of the order ticket. This section specifies physical settings for a print job. A standard paper size can be specified through a PaperSize field 1700 multiple options for a size of paper are available and supported by a print merchant computer. For more general paper sizes, a custom paper size may be selected in custom width, customer height and custom units fields 1701-1703 respectively. A media type may be specified in a media type field, to define a type of media and/or ink requested for a print job. Multiple options for media types are supported by the print merchant computer, as specified in different types of media such as canvas, paper, plastic, material or the like. Whenever a number of requested copies is greater than 1, a copies number field is filled in.

Referring to FIG. 18 herein, there is illustrated schematically an 'how and where to ship' section 1404 of the order ticket. This section specifies shipment settings for a whole order of print products. A ship name, ship address, ship zip code, ship city, ship state or province, ship country code, text or number field 1800-1806 respectively contains data describing a delivery address for shipping of print products. A ShipMethod field 1800 specifies, from a plurality of options supported by the print merchant computer, a method of shipping an order, e.g. urgent, 1 day delivery. A ShipNotificationURL field 1807 allows a content retailer computer to receive shipping notification from the print merchant computer. The order ticket carries a contact email and content phone field 1808, 1809 respectively for listing email and phone contact details of a customer.

Figure 19:
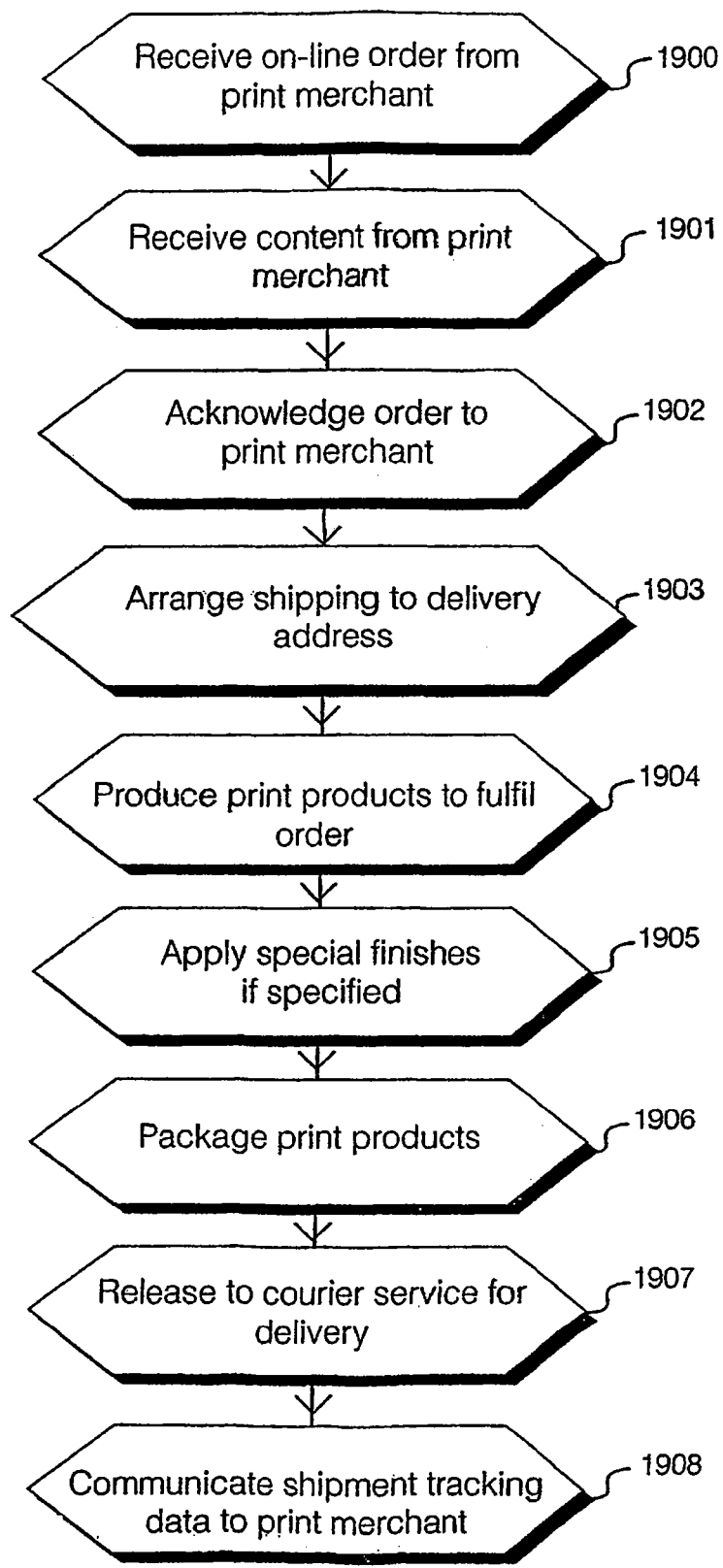
FIG. 19 illustrates schematically a mode of operation of a print manager computer entity for receiving and fulfilling an electronically received order for print products.

Referring to FIG. 19 herein, there is illustrated schematically a mode of operation of a print service provider operation, controlled by a print manager computer 108-110. In step 1900, the print manager computer receives an on-line order from a print merchant computer entity. In step 1901, the print manager computer receives image data content on-line. In a best mode implementation, the image content data is received from a print merchant computer entity. However, in an alternative implementation, the order sent from a print merchant may contain an address from which image data content may be obtained directly by the print service provider, in which case the print service provider may obtain image data directly from a content provider computer or other specified content source, by sending a content request message to that computer, specifying a ContentID field and supplying appropriate keys to the content provider computer. In addition to having a content ID, the print manager must be authorized to access image data, and this is done by use of keys. In step 1902, the print manager computer generates an acknowledgement of the received order from the print merchant, and sends this to the print merchant. In step 1903, the print merchant arranges, with the courier service, shipment of the products to one or more delivery addresses specified in the order. Step 1903, may be carried out in parallel with other steps of the print manager described herein. In step 1904 the print service provider produces the print products, by sending image data to one of a plurality of printer devices 111,112 within that print service provider facility. Any special finishes are applied manually, if specified in the order, in step 1905. In step 1906, the printed and finished products are sent through to a shipping department of the print service provider, where shipping labels are attached to the products, and the order is packaged into an appropriate number of packets for shipping. In step 1907, the packaged and addressed print products are released to a courier service, who handles delivery of the print products to the end user, usually the retail customer themselves, or a person specified by a retailer customer. In step 1908, the print manager computer generates a tracking data and issues this to the print merchant computer, either by sending it as an XML message, or an email confirmation, or by making it available on a website operated by the print manager computer.

The invention claimed is:

1. A method associated with a print merchant for matching a plurality of orders of a first type for print products, with a plurality of print service providers capable of fulfilling said orders, said method comprising:
   receiving, by a print merchant computer, a request for an order identification;
   issuing, by the print merchant computer, an order identification in response to said request;
   receiving, by the print merchant computer, an order of said first type for supply of print products;
   acknowledging, by the print merchant computer, said received first type order;
   in response to said received first type order, selecting, by the print merchant computer, a print service provider from said plurality of print service providers, wherein the selecting from said plurality of print service providers is based on price quotes from corresponding ones of said plurality of print service providers, based on contractual provisions of contracts between the print merchant and corresponding ones of said plurality of print service providers, and based on corresponding delivery times supported by said print service providers of said print products specified by said received first type order;
   placing, by the print merchant computer, an order of a second type with at least said selected print service provider, for ordering supply of said print products specified by said received first type order.

2. The method as claimed in claim 1 further comprising:
   receiving, by the print merchant computer, a request for a quotation for fulfilling said received first type order;
   generating, by the print merchant computer, said quotation for fulfilling said received first type order;
   sending, by the print merchant computer, said quotation for fulfilling said received first type order to a content retailer remote computer entity.

3. The method as claimed in claim 1 further comprising:
   generating, by the print merchant computer, a tracking message containing data describing a status of said print products specified by said received first type order; and
   making said tracking message available to a computer entity originating said received first type order.

4. The method as claimed in claim 1 further comprising:
   in response to said received first type order, issuing, by the print merchant computer, a request to a remote computer entity, for download of image data content from said remote computer entity, the image data content being associated with said received first type order;
   receiving, by the print merchant computer, said image data content in response to said issued request; and
   sending, by the print merchant computer, said image data content to said selected print service provider.

5. The method as claimed in claim 1, wherein in response to receiving said first type order, carrying out:
   checking a time stamp associated with said received first type order against a predetermined timeout period;
   if said time stamp is expired based on said checking, rejecting said received first type order;
   if said time stamp is expired, notifying a sender of said received first type order that said time stamp is invalid.

6. The method as claimed in claim 1, wherein selecting the print service provider from said plurality of print service providers is based on stored electronic contract data representing the contracts.

7. The method as claimed in claim 1, wherein selecting the print service provider from said plurality of print service providers based on the price quotes comprises:
   selecting based on the price quotes each including a print price and a delivery price.

8. A print merchant computer system associated with a print merchant, comprising:
   a processor; and
   a program executable on the processor to:
      receive a plurality of orders of a first type, each for supply of at least one corresponding print product;
      in response to a particular one of the plurality of the first type orders, select a print service provider from a plurality of print service providers, wherein the selecting from the plurality of print service providers is based on price quotes from corresponding ones of the plurality of print service providers, based on contractual provisions of contracts between the print merchant and corresponding ones of the plurality of print service providers, and based on corresponding delivery times supported by said print service providers of said at least one print product specified by said particular first type order; and
      place at least one order of a second type with at least the selected print service provider for ordering supply of said at least one print product specified by the particular first type order.

9. The print merchant computer system as claimed in claim 8, wherein the program is executable on the processor to further:
   in response to the particular first type order, issue a request to a remote computer entity, for download of image data content from the remote computer entity, the image data content being associated with the particular first type order;
   receive the image data content in response to the request; and
   send the image data content to the selected print service provider.

10. The print merchant computer system as claimed in claim 8, wherein in response to receiving the particular first type order, the program is executable to further:
    check a timestamp associated with the particular first type order to determine if the timestamp has expired;
    if the timestamp has expired, reject the particular first type order.

* * * * *